United States Patent
Wang

(10) Patent No.: US 9,453,584 B2
(45) Date of Patent: Sep. 27, 2016

(54) ELECTROMAGNETIC RELIEF VALVE FOR TURBOCHARGER

(71) Applicant: Yaoting Wang, Wuxi (CN)

(72) Inventor: Yaoting Wang, Wuxi (CN)

( * ) Notice: Subject to any disclaimer, the term of this patent is extended or adjusted under 35 U.S.C. 154(b) by 0 days.

(21) Appl. No.: 14/792,614

(22) Filed: Jul. 7, 2015

(65) Prior Publication Data
US 2016/0215899 A1 Jul. 28, 2016

(30) Foreign Application Priority Data
Jan. 26, 2015 (CN) .......................... 2015 1 0039845

(51) Int. Cl.
| F16K 31/06 | (2006.01) |
| H01F 7/08 | (2006.01) |
| H01F 7/121 | (2006.01) |
| F16K 17/00 | (2006.01) |

(52) U.S. Cl.
CPC ........... *F16K 31/0675* (2013.01); *F16K 17/00* (2013.01); *H01F 7/081* (2013.01); *H01F 7/121* (2013.01)

(58) Field of Classification Search
CPC .... F16K 31/0675; F16K 17/00; H01F 7/081; H01F 7/121
USPC ...................... 251/129.15; 335/262, 279, 281
See application file for complete search history.

(56) References Cited

U.S. PATENT DOCUMENTS

| 4,563,133 | A | * | 1/1986 | Yasuhara | ............ F02M 41/126 251/129.15 |
| 5,402,093 | A | * | 3/1995 | Gibas | ..................... H01F 7/081 251/129.07 |
| 6,322,049 | B1 | * | 11/2001 | Hofmann | ............... B60T 8/363 251/129.15 |
| 6,994,234 | B2 | * | 2/2006 | de Leeuw | ............ B05C 5/0225 251/129.15 |
| 7,066,154 | B2 | * | 6/2006 | Zdravkovic | ........ F02M 25/0809 251/129.15 |
| 2011/0121214 | A1 | * | 5/2011 | Stoeckel | ............ F16K 31/0634 251/129.01 |

* cited by examiner

*Primary Examiner* — John Bastianelli

(57) ABSTRACT

An electromagnetic relief valve for turbocharger includes a valve body and an electromagnetic bonnet. The bottom of the valve body is provided with a static core, the periphery of the static core is provided with a magnetic conductive disc, the top of the magnetic conductive disc is provided with a coil holder, which is provided with a coil winding wrapped around the periphery of the static core. The top of the valve body is provided with a dynamic core corresponding to the static core, a compressed spring is provided between the dynamic core and the static core, and the exterior of the dynamic core is provided with a sliding bearing and the periphery of the dynamic core is provided with an integrated magnetic cover with a magnetic ring matched with the magnetic conductive disc. The relief valve actuates and forms a more uniform magnetic force line.

15 Claims, 5 Drawing Sheets

ELECTROMAGNETIC RELIEF VALVE FOR TURBOCHARGER

CROSS-REFERENCE TO RELATED APPLICATIONS

This present application claims the benefit of Chinese Patent Application No. 201510039845.6 filed on Jan. 26, 2015, the contents of which are hereby incorporated by reference.

FIELD OF THE INVENTION

The invention relates to a turbocharger component, in particular to a new electromagnetic relief valve for turbocharger.

BACKGROUND OF THE INVENTION

Currently, the turbocharging technology is becoming more and more popular for its capacity of effectively enhancing the efficiency of the engine. It has become one of the main trends for energy saving and environmental protection in the gasoline energy times. At present, a lot of electromagnetic valves are widely applied in the field of turbocharged engines. However, most electromagnetic valves existing in the market include an electromagnetic circuit comprising a coil winding wrapped around the coil holder, a static core, a dynamic core, a magnetic conductive disc and a magnetic cover, etc., wherein, the dynamic core is generally hollow and in most movably mounted on the guide pin with its radial outward surface. With the rapid development of electronic technology at home and abroad, the demand for all kinds of electromagnetic valves is growing, meanwhile, the requirement for leakage control of the electromagnetic valve is higher. However, the existing electromagnetic valves for turbocharger have the problems as follows:

1. The guide pin results in complex processing and installation in manufacturing, high production costs and unstable operations of the valve.
2. The electromagnetic relief valve for turbocharger is usually provided with a seal cover. The existing seal cover is plastically molded. It is relatively rigid and easy to become deformed after long period of application under high temperature, resulting in a greater leakage, which is difficult to control for rapid pressurization or depressurization.
3. Lathing method is usually applied in prior art to produce the V-shaped seal ring with high temperature resistance. The disadvantages of this approach are as follows: on one hand, it needs precision lathes and other expensive manufacturing equipment, and on the other hand, lathing method requires stricter purity of bar materials, resulting in the poor performance of the V-shaped ring with high temperature resistance. In prior art, the method of injection molding for production of the V-shaped ring with high temperature resistance also has corresponding problems. It proposes high requirements for the molds. And a long period of application under high or low temperature will result in serious deformation, therefore, it is difficult to control its sealing performance, and the leakage is not easy to reach the standard requirement.

SUMMARY OF THE INVENTION

To solve the above problems, the invention provides a new electromagnetic relief valve for turbocharger, which simplifies the structure and effectively increases the magnetic force of the pressure relief valve for a more uniform magnetic force line in the whole actuation process.

The technical scheme of the invention is achieved by:

An electromagnetic relief valve for turbocharger, comprising a valve body and an electromagnetic bonnet, the bottom of the valve body is provided with a static core, the periphery of the bottom of the static core is provided with a magnetic conductive disc, the upper part of the magnetic conductive disc is provided with a coil holder, which is provided with a coil winding wrapped around the periphery of the static core; the top of the valve body is provided with a dynamic core corresponding to the static core, a compressed spring is provided between the dynamic core and the static core, and the exterior of the dynamic core is provided with a sliding bearing and the periphery of the dynamic core is provided with an integrated magnetic cover with a magnetic ring matched with the magnetic conductive disc; a non-magnetizable guide sleeve is mounted in the integrated magnetic cover and the coil holder, the bottom of the guide sleeve contacts with the bottom of the inner hole of the static core, the guide sleeve is positioned by the magnetic cover and the static core, and the dynamic core is hollow and movably mounted in the guide sleeve with its radial outward surface.

Further, the static core is cylindrical and the top of the static core is of a chamfered structure, wherein, the chamfer angle of the chamfered structure is 1°-10° and the height of the chamfered structure is 1 mm-8 mm so that the relief valve can actuate freely under operating voltage.

Further, one end of the compressed spring abuts against in the inner hole of the dynamic core, the other end of the compressed spring is supported on the bottom of the inner hole of the static core, and the static core is provided with an embossment for positioning the compressed spring.

Further, the embossment and the static core are integrally molded or integrated by assembling.

Further, the dynamic core is fixedly connected with a seal cover body by a dynamic core washer and the seal cover body is connected with a seal cover assembly by a snap joint to improve the efficiency of product assembly and production.

Further, the seal cover assembly is in particular provided with a plurality of grooves along its circumferential direction, the seal cover body is provided with a plurality of embossments in its internal axial direction corresponding to the grooves, and the embossments are snapped in the grooves.

Further, the periphery of the seal cover body is provided with a V-shaped seal ring with high temperature resistance, and the top of the seal cover assembly is embedded with an annular rubber gasket with high temperature resistance, thereby enhancing the sealing performance of the relief valve and achieving rapid pressurization or depressurization.

Further, the coil holder may be provided, or not, with a reinforcing rib for combining the magnetic cover, and the reinforcing rib and the coil holder are integrally molded or integrated by assembling.

Further, the tensile height of the integrated magnetic cover with a magnetic ring is 3 mm-12 mm to achieve optimal magnetically actuating effect.

Further, the dynamic core is provided with a plurality of vent grooves so that the air in the relief valve will not affect the stable sliding of the dynamic core.

Further, the number of the vent groove is preferably two.

Furthermore, the inner hole of the dynamic core is press-mounted with a guide pillar of magnetizable material, thereby further increasing the magnetic area and suction and fixing the compressed spring.

The technical scheme of the invention adopts the guide sleeve to slidably guide the dynamic core so as to make the relief valve actuate and form a more uniform magnetic force line, which further simplifies the structure of the relief valve, thus resulting in an easy assembly and lower costs.

BRIEF DESCRIPTION OF THE DRAWINGS

In order to more clearly illustrate the technical scheme in the embodiments of the invention or in prior art, the following contents focus on description of the drawings for the embodiment or in prior art. It is obvious that the following drawings are only from some embodiments of the invention. Without creative efforts, a person skilled in the field can further obtain other drawings according to such drawings.

DESCRIPTION OF THE PREFERRED EMBODIMENTS

The technical scheme of the embodiments of the invention will be described clearly and completely in combination with the drawings of the embodiments of the invention.

Figure 1:
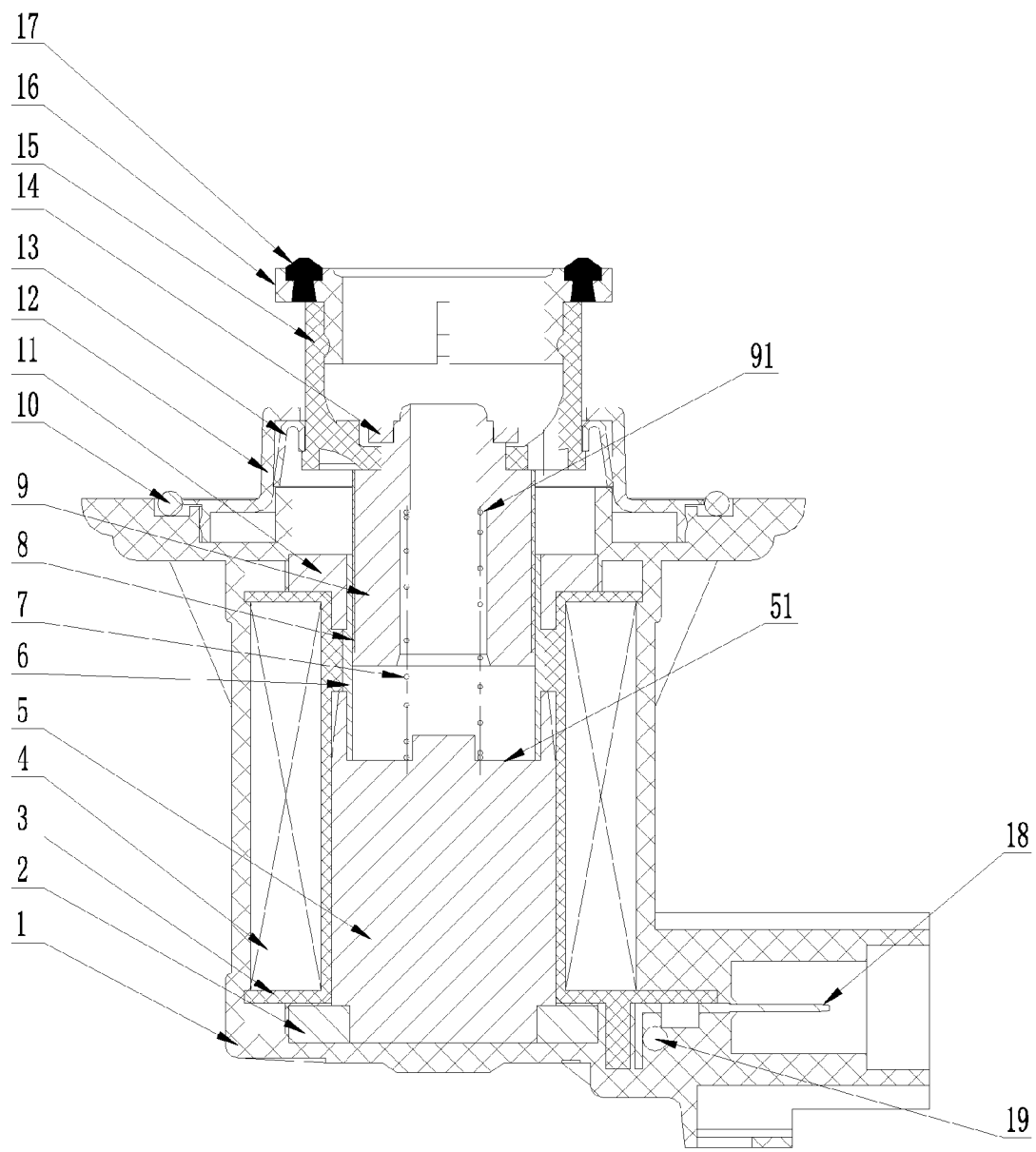
FIG. 1 is the schematic diagram of the pressure relief valve in an embodiment of the invention when it is unpowered.

As shown in FIG. 1, a new electromagnetic relief valve for turbocharger in the embodiment comprises a high-temperature-resistant plastic valve body 1 with an electronic element resistor 19 and a connecting copper piece 18, wherein, the valve body 1 seals the electromagnetic bonnet 12 by an O-shaped seal ring 10, the bottom of the valve body 1 is provided with a static core 5, the periphery of the bottom of the static core 5 is provided with a magnetic conductive disc 2, the upper part of the magnetic conductive disc 2 is provided with a coil holder 3 and the coil holder 3 is provided with a coil winding 4 wrapped around the periphery of the static core 5.

The top of the valve body 1 is provided with a dynamic core 9 corresponding to the static core 5, a compressed spring 7 is provided between the dynamic core 9 and the static core 5, and the exterior of the dynamic core 9 is provided with a sliding bearing 8 and the periphery of the dynamic core 9 is provided with an integrated magnetic cover 11 with a magnetic ring matched with the magnetic conductive disc 2, wherein, a guide sleeve 6 is mounted in the integrated magnetic cover 11 and the coil holder 3. The bottom of the guide sleeve 6 contacts with bottom of the inner hole 51 of the static core 5. The guide sleeve 6 is positioned by the magnetic cover 11 and the static core 5.

Wherein, the dynamic core 9 is hollow and movably mounted in the guide sleeve 6 with its radial outward surface.

Figure 2:
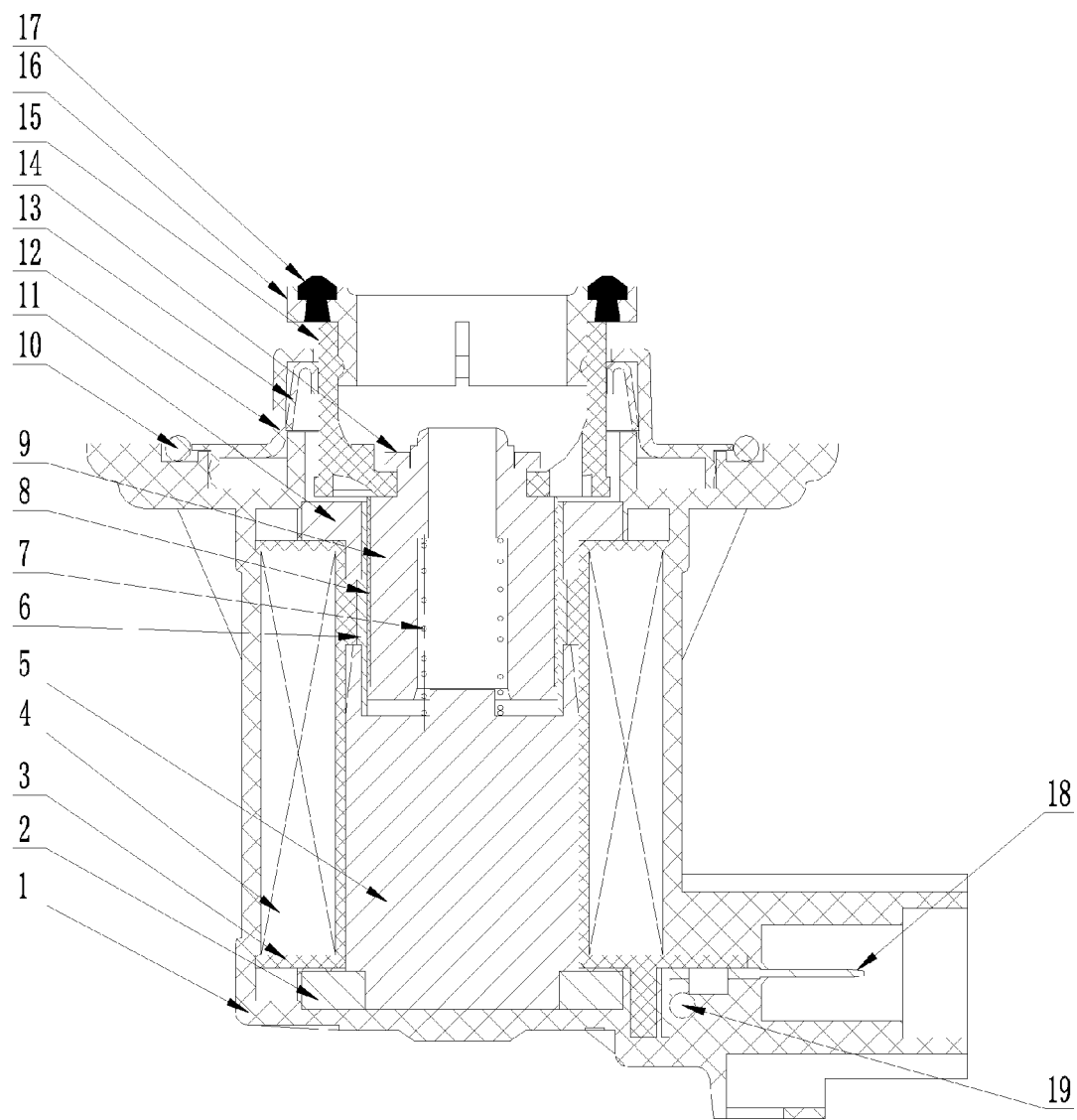
FIG. 2 is the schematic diagram of the pressure relief valve in an embodiment of the invention when it is powered.

As shown in FIG. 2, after the connecting copper piece 18 of the pressure relief valve of the embodiment of the invention is powered and the coil winding 4 is powered, the static core 5 becomes magnetic so that the dynamic core 9 with the sliding bearing 8 can overcome the force of the compressed spring 7 and slide toward the static core 5 in the guide sleeve 6. In the embodiment of the invention, the guide sleeve 6 is made of a non-magnetizable material so as not to affect the stable sliding of the dynamic core. Apparently, in the embodiment of the invention, the guide sleeve may also be made of non-magnetizable materials by other known methods.

Figure 3:
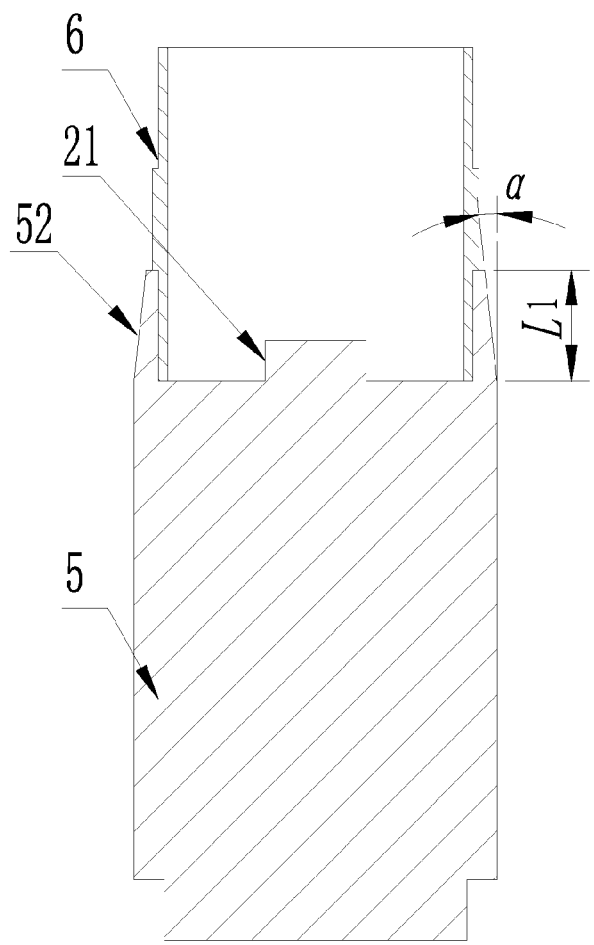
FIG. 3 is the schematic diagram of the static core and guide sleeve in an embodiment of the invention.

As shown in FIG. 3, in the embodiment of the invention, the static core 5 is cylindrical and the top of the static core 5 is of a chamfered structure 52, wherein the chamfer angle of the chamfered structure 52 $\alpha$ is 1°-10° and the height L1 of the chamfered structure 52 is 1 mm-8 mm, so that the relief valve can actuate freely under operating voltage.

In the embodiment of the invention, one end of the compressed spring 7 abuts against in the inner hole 91 of the dynamic core 9, the other end of the compressed spring 7 is supported on the bottom of the inner hole 51 of the static core 5, and the static core 5 is provided with an embossment 21 for positioning the compressed spring 7. In the embodiment of the invention, the depth of the inner hole 51 of the static core 5 is 5 mm-5.5 mm, the height of the embossment 21 in the inner hole 51 for positioning the compressed spring 7 is 2.5 mm-10 mm, and the diameter of the embossment 21 is preferably 2.5 mm-7 mm. Apparently, the diameter of the embossment 21 can be freely defined in accordance with the inner hole of the compressed spring 7. Such design can achieve the optimal magnetic flux and increase the actuating force.

In the embodiment of the invention, in order to facilitate the manufacturing, the embossment 21 and the static core 5 are integrally manufactured or integrated by assembling after being manufactured separately.

Figure 4:
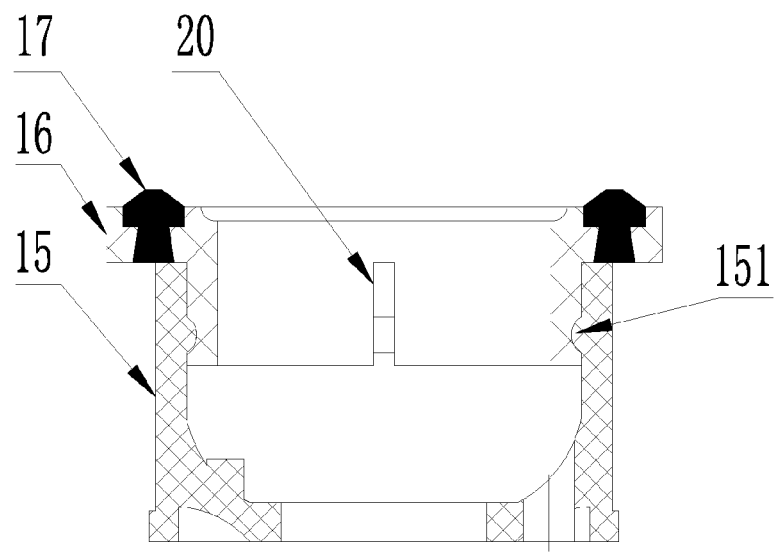
FIG. 4 is the schematic diagram of the seal cover body and the seal cover assembly in an embodiment of the invention.

As shown in FIG. 4, in the embodiment of the invention, the dynamic core 9 is fixedly connected with a seal cover body 15 by a dynamic core washer 14 and the seal cover body 15 is connected with a seal cover assembly 16 by a snap joint to improve the efficiency of product assembling and production.

In the embodiment of the invention, the seal cover assembly 16 is preferably provided with a plurality of grooves 20 along its circumferential direction, the seal cover body 15 is provided with a plurality of embossments 151 in its internal axial direction corresponding to the grooves 20, and the embossments 151 are snapped in the grooves 20, wherein, the number of the grooves may be two, four or more.

Figure 8:
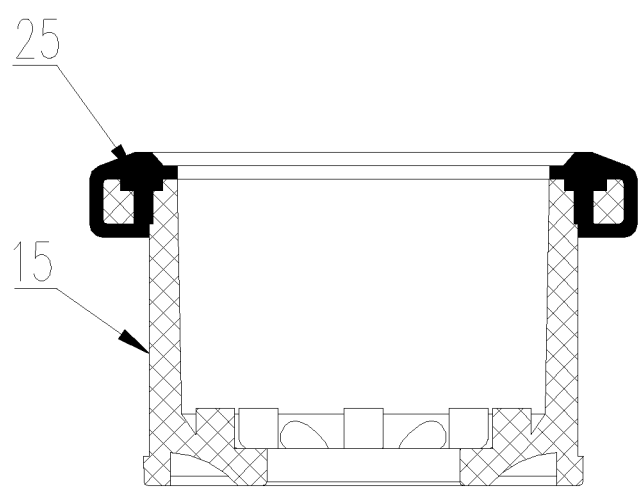
FIG. 8 is another schematic diagram of the seal cover assembly in an embodiment of the invention.

As shown in FIG. 8, in the embodiment of the invention, in order to facilitate the manufacturing, the seal cover body 15 and the seal cover assembly 16 may be integrally manufactured, and the top of them is embedded with an annular rubber gasket 25 with high temperature resistance, thereby enhancing the sealing performance of the relief valve and achieving rapid pressurization or depressurization.

The periphery of the seal cover body 15 is provided with a V-shaped seal ring 13 with high temperature resistance, and the top of the seal cover assembly 16 is embedded with an annular rubber gasket 17 with high temperature resistance, thereby enhancing the sealing performance of the relief valve and achieving rapid pressurization or depressurization.

Figure 5:
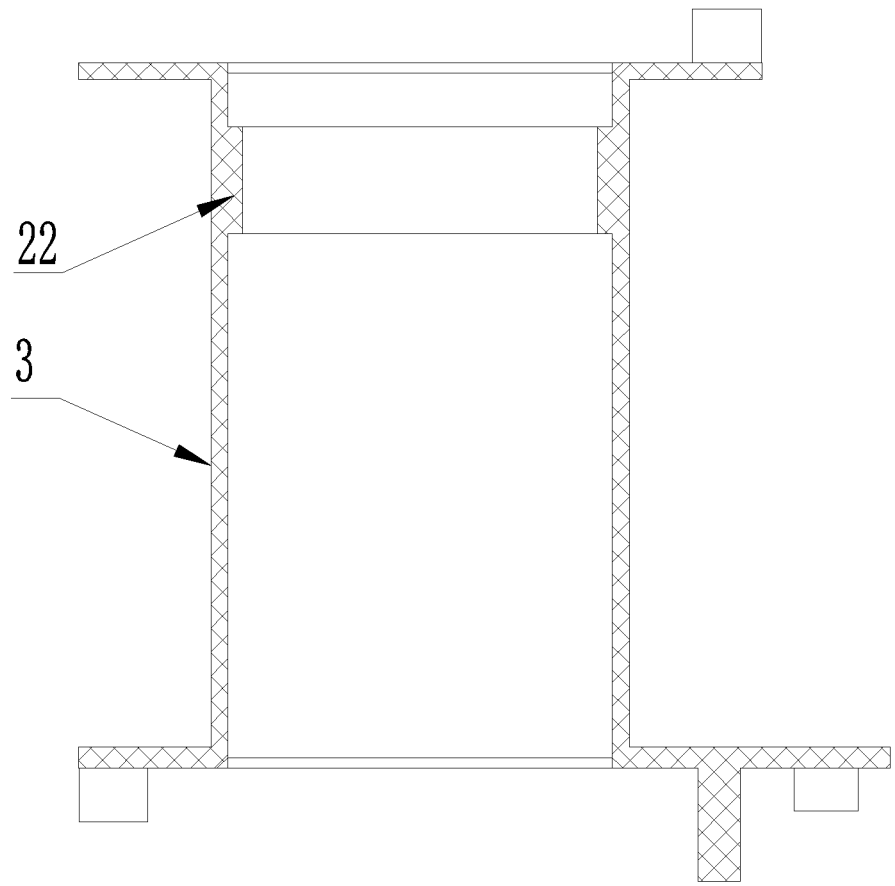
FIG. 5 is the schematic diagram of the coil holder in an embodiment of the invention.

As shown in FIG. 5, in the embodiment of the invention, the coil holder 3 may be provided, or not, with a reinforcing rib 22 for combining the magnetic cover 11. In order to facilitate the manufacturing, the reinforcing rib 22 and the coil holder 3 are integrally molded or integrated by assembling after being manufactured separately.

Figure 6:
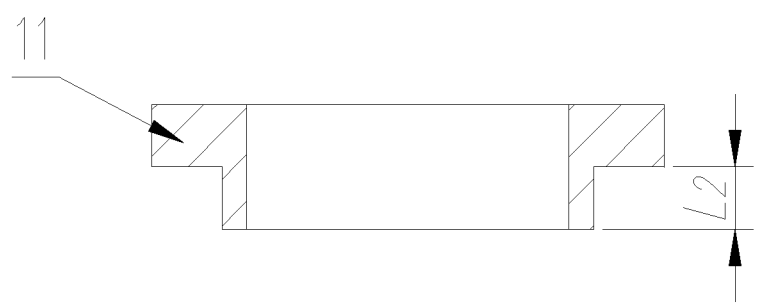
FIG. 6 is the schematic diagram of the magnetic cover in an embodiment of the invention.

As shown in FIG. 6, in the embodiment of the invention, the tensile height L2 of the integrated magnetic cover with a magnetic ring is 3 mm-12 mm for the achieve optimal magnetically actuating effect.

In the embodiment of the invention, the dynamic core 9 is preferably provided with a plurality of vent grooves 24, so that the air in the relief valve will not affect the stable sliding of the dynamic core 9. There are a plurality, preferably 2, of the vent grooves 24.

Figure 7:
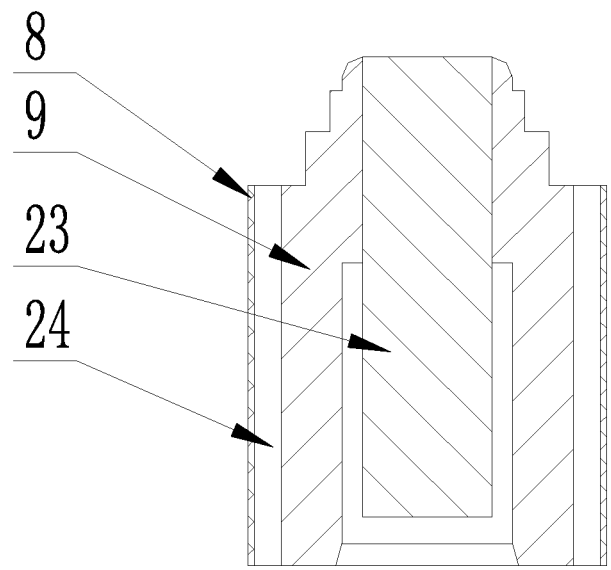
FIG. 7 is the schematic diagram of the dynamic core pillar in an embodiment of the invention.

As shown in FIG. 7, in the embodiment of the invention, the inner hole of the dynamic core 9 is press-mounted with a guide pillar 23 of magnetizable material, thereby further increasing the magnetic area and suction and fixing the compressed spring.

The foregoing description is only the preferred embodiments of the invention, which will not limit the protection scope of the invention. Any modification, equivalent replacement and improvement based on the principles and spirits of the invention should be covered within the protection scope of the invention.

What is claimed is:

1. A electromagnetic relief valve for turbocharger, comprising a valve body and an electromagnetic bonnet, the bottom of the valve body is provided with a static core, the periphery of the bottom of the static core is provided with a magnetic conductive disc, the upper part of the magnetic conductive disc is provided with a coil holder, which is provided with a coil winding wrapped around the periphery of the static core; the top of the valve body is provided with a dynamic core corresponding to the static core, a compressed spring is provided between the dynamic core and the static core, and the exterior of the dynamic core is provided with a sliding bearing and the periphery of the dynamic core is provided with an integrated magnetic cover with a magnetic ring matched with the magnetic conductive disc; wherein, a non-magnetizable guide sleeve is mounted in the integrated magnetic cover and the coil holder, the bottom of the guide sleeve contacts with the bottom of an inner hole of the static core, the guide sleeve is positioned by the magnetic cover and the static core, and the dynamic core is hollow and movably mounted in the guide sleeve with its radial outward surface.

2. The electromagnetic relief valve for turbocharger according to claim 1, wherein the static core is cylindrical and the top of the static core is of a chamfered structure the chamfer angle of the chamfered structure is 1°-10°, and the height of the chamfered structure is 1 mm-8 mm.

3. The electromagnetic relief valve for turbocharger according to claim 2, wherein one end of the compressed spring abuts against in the inner hole of the dynamic core, the other end of the compressed spring is supported on the bottom of the inner hole of the static core, and the static core is provided with an embossment for positioning the compressed spring.

4. The electromagnetic relief valve for turbocharger according to claim 3, wherein the depth of the inner hole of the static core is 5 mm-5.5 mm, the height of the embossment in the inner hole of the static core is 2.5 mm-10 mm, and the diameter of the embossment is 2.5 mm-7 mm.

5. The electromagnetic relief valve for turbocharger according to claim 4, wherein the embossment and the static core are integrally molded or integrated by assembling.

6. The electromagnetic relief valve for turbocharger according to claim 1, wherein the dynamic core is fixedly connected with a seal cover body by a dynamic core washer and the seal cover body is connected with a seal cover assembly.

7. The electromagnetic relief valve for turbocharger according to claim 6, wherein the seal cover body and the seal cover assembly are connected by a snap joint; the seal cover assembly is provided with a plurality of grooves along its circumferential direction, the seal cover body is provided with a plurality of embossments in its internal axial direction corresponding to the grooves, and the embossments are snapped in the grooves.

8. The electromagnetic relief valve for turbocharger according to claim 6, wherein the seal cover body and the seal cover assembly are integrally manufactured.

9. The electromagnetic relief valve for turbocharger according to claim 7, wherein the periphery of the seal cover body is provided with a V-shaped seal ring with high temperature resistance, and the top of the seal cover assembly is embedded with an annular rubber gasket with high temperature resistance.

10. The electromagnetic relief valve for turbocharger according to claim 8, wherein the periphery of the seal cover body is provided with a V-shaped seal ring with high temperature resistance, and the top of the seal cover assembly is embedded with an annular rubber gasket with high temperature resistance.

11. The electromagnetic relief valve for turbocharger according to claim 1, wherein the coil holder is provided with a reinforcing rib for combining the magnetic cover, and the reinforcing rib and the coil holder are integrally molded or integrated by assembling.

12. The electromagnetic relief valve for turbocharger according to claim 11, wherein the tensile height of the integrated magnetic cover with a magnetic ring is 3 mm-12 mm.

13. The electromagnetic relief valve for turbocharger according to claim 1, wherein the dynamic core is provided with a plurality of vent grooves.

14. The electromagnetic relief valve for turbocharger according to claim 13, wherein the number of the vent grooves are two.

15. The electromagnetic relief valve for turbocharger according to claim 1, wherein the inner hole of the dynamic core is press-mounted with a guide pillar of magnetizable material.

* * * * *